(12) United States Patent
Keller

(10) Patent No.: US 8,096,229 B2
(45) Date of Patent: Jan. 17, 2012

(54) METHOD OF DETECTING THE ABSENCE OF COFFEE BEANS IN A COFFEE GRINDER OF A COFFEE MACHINE AND COFFEE MAKER FOR PERFORMING THE METHOD

(75) Inventor: Peter Keller, Bauma (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 965 days.

(21) Appl. No.: 11/369,459

(22) Filed: Mar. 7, 2006

(65) Prior Publication Data

US 2006/0222736 A1 Oct. 5, 2006

(30) Foreign Application Priority Data

Mar. 29, 2005 (CH) .................................... 0533/05

(51) Int. Cl.
*A47J 31/42* (2006.01)
(52) U.S. Cl. ........................................................ 99/286
(58) Field of Classification Search .................. 99/286; 241/36; *A47J 31/00*
See application file for complete search history.

(56) References Cited

U.S. PATENT DOCUMENTS

| | | | | |
|---|---|---|---|---|
| 3,825,231 A * | 7/1974 | McFarland | .................. | 366/196 |
| 3,987,715 A * | 10/1976 | Muller | .................. | 99/275 |
| 4,007,675 A | 2/1977 | Cailliot et al. | | |
| 4,336,433 A * | 6/1982 | Yokozeki | .................. | 219/707 |
| 4,672,181 A * | 6/1987 | Sakamoto et al. | ............ | 219/518 |
| 4,787,299 A * | 11/1988 | Levi et al. | .................. | 99/285 |
| 4,789,106 A | 12/1988 | Weber | | |
| 4,833,978 A * | 5/1989 | Martone et al. | .................. | 99/280 |
| 5,186,399 A * | 2/1993 | Knepler et al. | .................. | 241/34 |
| 5,201,474 A * | 4/1993 | Midden | .................. | 241/100 |
| 5,307,733 A * | 5/1994 | Enomoto | .................. | 99/280 |
| 5,386,944 A * | 2/1995 | Knepler et al. | .................. | 241/6 |
| 5,412,675 A * | 5/1995 | Odagawa | ................ | 372/29.021 |
| 5,463,932 A * | 11/1995 | Olson | .................. | 99/280 |
| 5,511,465 A * | 4/1996 | Friedrich et al. | .................. | 99/286 |
| 5,522,556 A * | 6/1996 | Knepler et al. | .................. | 241/34 |
| 5,660,336 A * | 8/1997 | Joseph et al. | .................. | 241/27 |
| 5,836,236 A * | 11/1998 | Rolfes et al. | .................. | 99/290 |
| 5,862,738 A * | 1/1999 | Warne | .................. | 99/281 |
| 5,992,299 A * | 11/1999 | Fong | .................. | 99/286 |
| 6,238,721 B1 * | 5/2001 | Knepler | .................. | 426/590 |
| 6,260,479 B1 * | 7/2001 | Friedrich et al. | .................. | 99/468 |
| 6,572,036 B2 * | 6/2003 | Glucksman et al. | ............ | 241/27 |
| 7,273,005 B2 * | 9/2007 | Turi | .................. | 99/286 |
| 7,350,455 B2 * | 4/2008 | Vetterli | .................. | 99/280 |
| 2005/0279219 A1 * | 12/2005 | Turi | .................. | 99/286 |

(Continued)

FOREIGN PATENT DOCUMENTS

CH EP0676162 A1 * 10/1995

(Continued)

*Primary Examiner* — Duc Nguyen
*Assistant Examiner* — Mark Woodall

(57) ABSTRACT

In order to detect a lack of coffee beans in a grinder unit of a coffee maker, a method is suggested in which the level and/or the spectrum of an oscillation generated by the grinder unit during its operation is measured. The level of the oscillation and/or the nature of the spectrum are used to decide whether or not coffee beans are present in the grinder unit. Preferably, the level of oscillation of the housing of the coffee grinder unit is monitored. If the level changes by more than a preset value and/or falls below a reference value, it is decided that coffee beans are lacking.

7 Claims, 1 Drawing Sheet

U.S. PATENT DOCUMENTS

2006/0057939 A1 * 3/2006 Yui et al. .......................... 451/5
2008/0202345 A1 * 8/2008 Delonghi ........................ 99/280
2009/0293733 A1 * 12/2009 Martin et al. ................... 99/280

FOREIGN PATENT DOCUMENTS

| | | | |
|---|---|---|---|
| DE | EP1440641 A1 * | 7/2004 | |
| EP | 0 676 162 | 10/1995 | |
| EP | 1 440 641 | 7/2004 | |
| JP | 64086921 | * | 9/1987 |
| JP | 5-300837 A | * | 11/1993 |
| JP | 7204096 A | * | 8/1995 |
| JP | 8107826 | | 4/1996 |
| JP | 8107826 A | * | 4/1996 |
| JP | 2000051101 A | * | 2/2000 |

* cited by examiner

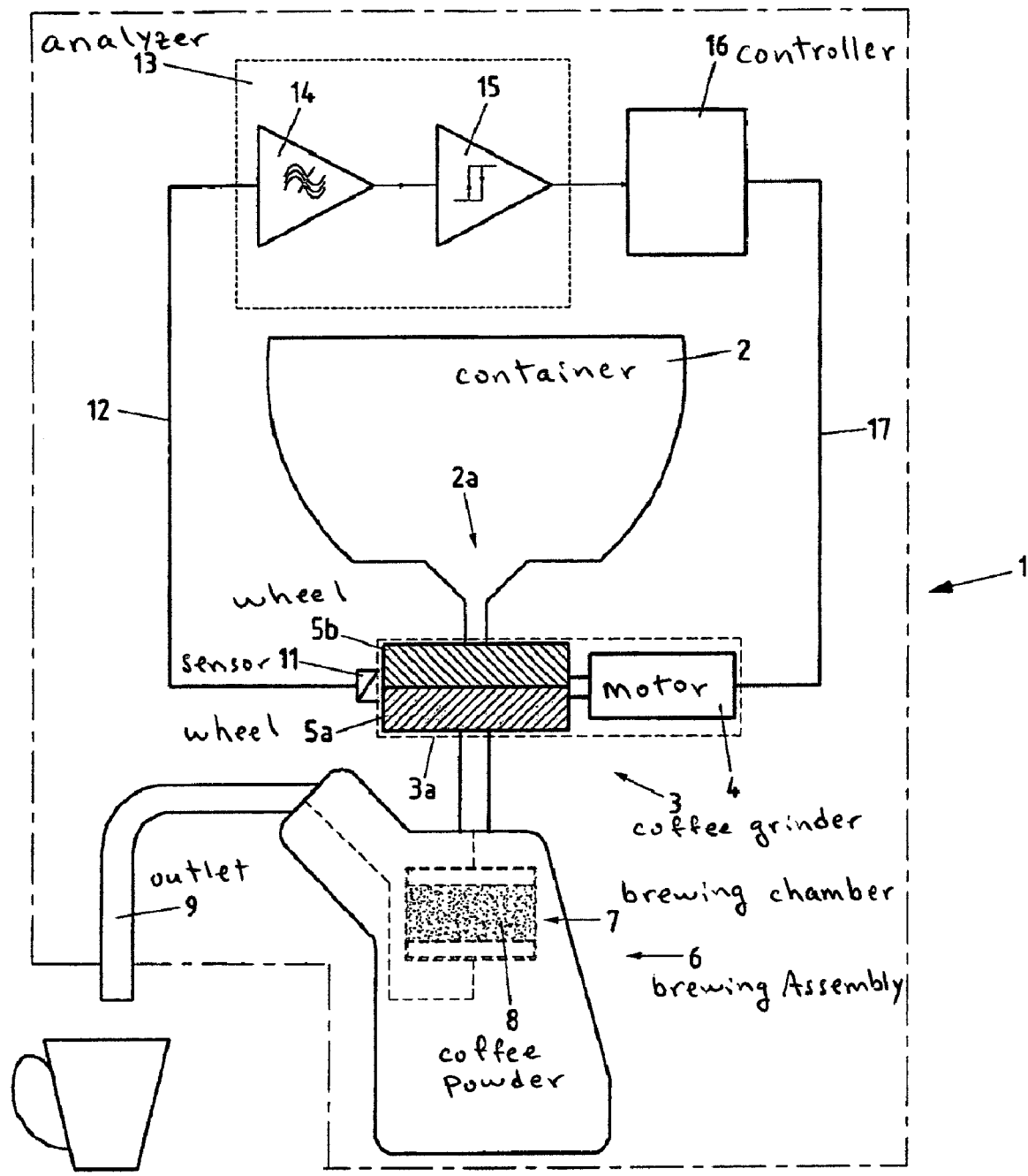

METHOD OF DETECTING THE ABSENCE OF COFFEE BEANS IN A COFFEE GRINDER OF A COFFEE MACHINE AND COFFEE MAKER FOR PERFORMING THE METHOD

BACKGROUND OF THE INVENTION

Coffee makers of the kind referred to herein are adapted to prepare a fresh coffee beverage fully automatically. Such coffee makers comprise a coffee bean container for receiving coffee beans to be ground, a grinder unit for grinding the coffee beans, and a brewing unit to which the freshly ground coffee powder is fed. In the brewing unit, the coffee powder is compressed and, thereafter, hot pressurized brewing water flows through the compressed coffee powder to extract a coffee beverage. Such coffee makers are also called "Espresso Coffee Machines" in general language use.

There is one particular problem in connection with these coffee makers, inasmuch as a lack of coffee beans in the grinder unit should be detected as soon as possible; otherwise, the drive motor of the grinder unit could overheat if it runs under no load conditions for a certain time. Another problem is seen in the fact that a relationship should be established to the amount of coffee beans already ground in the actual grinding cycle once the lack of coffee beans has been detected; thereby, after refilling coffee beans, the grinding cycle can be continued to grind only the remaining amount of coffee beans required to complement the already ground amount such that the correct total amount of coffee powder results that is required to brew a proper coffee beverage. Otherwise, the already ground amount of coffee would have to be discarded without having been used and replaced by a new, full charge of coffee powder.

PRIOR ART

The detection of a lack of coffee beans in a grinder unit of a coffee maker by means of conventional sensing means is problematic, since these are subject to rapid contamination, the more so as coffee beans are fatty and because coffee dust develops during the grinding operation, that dust being destructive for most of the sensing means used up to now.

Moreover, it is known in the prior art to measure the current the electric motor driving the grinding unit draws and to conclude from the magnitude of the current to the presence or absence of coffee beans in the grinder unit. Such a method may be theoretically possible since the motor of the grinder unit draws more current under load than during operating in a no load condition. However, this method did not prove its reliability in practice because, in most cases, a gearbox is arranged between motor and grinder unit, hampering the detection of a lack of coffee beans because, due to the high reduction ratio of the gearbox, only a small difference in current draw can be observed when the motor is operated under load and under no load conditions, respectively.

A further problem is presented by the fact that certain components of the grinder unit run in over the months and years, resulting in a continuous reduction of the current draw of the motor; thus, the detection of a lack of coffee beans by means of measuring the current is additionally complicated and hampered, respectively.

Finally, further parameters as, for instance, the ambient temperature, the ambient humidity, the kind, size and degree of roasting of the coffee beans to be ground, the selected degree of grinding as well as changes and wear of the grinder unit due to aging can have an influence on the current draw and, thereby on the validity of the measurement.

OBJECT OF THE INVENTION

It is an object of the present invention to provide a method of detecting a lack of coffee beans in a coffee bean grinder unit of a coffee maker that is substantially independent of changing or adjustable parameters of the grinder unit, further that can be easily realized and that delivers a reliable indication of a lack of coffee beans. It is a further object of the invention to provide a coffee maker, using the method of the invention, in which the means required to reliably detect a lack of coffee beans in the grinder unit are cost efficient and simple in the practical application.

SUMMARY OF THE INVENTION

To meet these and other objects, the present invention provides, according to a first aspect, a method of detecting a lack of coffee beans in a coffee bean grinder unit. The method comprises the steps of measuring the level and/or the spectrum of an oscillation generated by the coffee bean grinder unit during its operation, and deciding whether or not coffee beans are present in the coffee bean grinder unit in dependence of the magnitude of the measured level and/or the nature of the measured spectrum of the oscillation. The grinding operation is interrupted if it is decided that no coffee beans are present in the coffee bean grinder unit.

According to a second aspect, the invention provides a coffee maker adapted to use the method described herein above. It comprises a coffee bean container, a grinder unit adapted to grind coffee beans, a brewing unit having a brewing chamber for extracting the ground coffee beans by means of hot, pressurized brewing water, and at least one sensor means for recording the level and/or the spectrum of the oscillation generated by the grinder unit during the operation of the grinder unit.

Thus, the fundamental idea of the invention consists in measuring the level and/or the spectrum of an oscillation generated by the grinder unit during its operation, and to decide on the basis of the measurement results whether beans are still present in the grinder unit or whether the latter one operates without load, i.e. without containing any coffee beans to be ground. Anyway, it has been shown that it is basically possible to detect the presence or lack of coffee beans in the grinder unit both on the basis of the measured level of oscillations and the measured nature of the spectrum of these oscillations.

In a preferred embodiment, the level of the oscillations is continuously recorded and the operation of the grinder unit is stopped if the measured level changes by more than a preset value or if it falls below a reference value. Thereby, particularly, advantage is taken of the fact that the level of of oscillations is substantially higher during a grinding operation than during an operation of the grinder unit under no load conditions.

BRIEF DESCRIPTION OF THE DRAWINGS

A preferred embodiment of the method and of the coffee maker according to the invention will be further described in the following, with reference to the sole drawing, showing a strictly schematic illustration of a coffee maker.

DETAILED DESCRIPTION OF THE PREFERRED EMBODIMENT

The coffee maker 1 schematically shown in the drawing comprises a coffee bean container 2, a coffee grinder 3, a brewing assembly 6, a beverage outlet 9, a sensor 11, an electronic monitoring and analyzing unit 13 as well as an electronic control unit 16. The coffee grinder 3 comprises an electric motor 4, driving by means of a reduction gearbox (not shown) at least one of two grinding wheels 5a, 5b. The coffee grinder 3 is located below the coffee bean container 2 and communicates with the coffee bean container 2 by means of a passage 2a.

A sensor 11 is attached to the housing 3a of the coffee grinder 3 and connected to the electronic monitoring and analyzing unit 13 by means of a conductor 12. The electronic monitoring and analyzing unit 13 itself is connected to the electronic control unit 16, and the latter one is connected to the coffee grinder 3 by means of a control conductor 17.

The brewing assembly 6 comprises a brewing chamber 7, serving for extracting the coffee and coffee powder 8, respectively, ground by the coffee grinder 3. The coffee powder 8 received in the brewing chamber 7 is compressed by means of a not shown piston and, thereafter, extracted by the brewing water fed into the brewing chamber 7 under pressure. The coffee beverage prepared in the brewing assembly 6 can flow through the beverage outlet 9 into a coffee cup put below the latter one.

Out of the two grinding wheels 5a, 5b, preferably only the grinding wheel 5a is driven by the electric motor 4, while the other grinding wheel is stationary and attached in a torque-proof manner to the housing 3a of the coffee grinder 3.

The sensor 11 attached to the housing 3a of the coffee grinder 3 is adapted to record a vibration or oscillation level, or a vibration or oscillation spectrum generated by the coffee grinder 3 during its operation. The present invention takes advantage of the fact that the coffee grinder 3 generates vibration or oscillations during its operation, the spectrum and particularly the level thereof distinctively changing depending on whether coffee beans are ground in the coffee grinder 3 or the coffee grinder runs without having any coffee beans to be ground in it, i.e. in a no load condition.

For monitoring the vibration or oscillations, it has proven to be advantageous to attach the sensor 11 to the housing 3a of the coffee grinder 3 or to a housing portion thereof. With a sensor 11 attached in this way, the vibration or oscillations of the housing 3a, excited by the operation of the electric motor 4 driving at least one of the two grinding wheels 5a, 5b, can be easily detected and, subsequently, electronically interpreted by the electronic monitoring and analyzing unit 13. Thereby, the electronic monitoring and analyzing unit 13 comprises a filter and amplifier circuitry 14 provided with a low pass filter as well as a threshold value switching circuitry 15. The threshold value switching circuitry 15 can be realized, for instance, by a comparator, comparing the measured value with a reference value and producing an output signal to the electronic control unit 16 as soon as the measurement value exceeds the reference value or falls below the reference value. In the case when a decision has to be take regarding beans are present in the coffee bean container 2, or the coffee bean container 2 does not contain any beans, on the basis of the measured vibration or oscillation level, the filter/amplifier circuitry 14 is preferably designed such that short peak-like level changes art not interpreted as lack of beans. Test measurements made with different existing coffee grinding units resulted in the fact that the vibration/oscillation level of the housing 3a of the grinding unit, depending on the design of the grinding unit and the boundary conditions, is different by a factor between 2 and 40 in the two operating conditions discussed here, i.e. the grinding unit is operated under load and grinds coffee beans, and the grinding unit is operated without load, i.e. it runs, but no beans are ground. Particularly, the level of vibration/oscillation is, under worst case conditions, twice as high when coffee beans are ground then when the grinding unit runs without load.

Using a piezo-electric sensor 11, directly attached to the housing 3a of the grinder 3, differences of the level of vibration/oscillation up to a factor of 15 have been measured in the two operation modes, i.e. grinding beans (under load operation) or no load operation (no beans present to be ground).

Moreover, by setting a second threshold value, a blocking of the grinding unit can be detected.

As soon as the electronic monitoring and analyzing unit 13 recognizes a lack of coffee beans in the grinder unit 3, a corresponding signal is sent to the control unit 16 which in turn stops the electric motor 4 of the grinder unit 3. Simultaneously, on a display (not shown) of the coffee maker, a notice appears that the coffee bean container 2 is empty and needs refill.

Instead of monitoring and analyzing the level of vibration or oscillation of the housing 3a of the grinder unit 3, also the spectrum of vibration/oscillations of the housing 3a of the grinder unit 3 can be recorded and processed by means of the subsequent monitoring and analyzing unit 13. Test have shown that the vibration spectrum and the vibration frequency, respectively, of the housing 3a of the grinder unit 3 changes distinctively between operating the grinding unit 3 under load and operating it in a no-load condition, i.e. without coffee beans to be ground. Particularly, the vibration spectrum and the vibration frequency, respectively, of the housing 3a of the grinder unit 3 is lower by as much as 50% under no-load condition. It is understood that both parameters, i.e. the level of vibration and the spectrum of vibration, can be used simultaneously for detecting a lack of coffee beans in the grinder unit 3.

Instead of a piezo-electric sensor, an inductive or a capacitive sensor could be used. Also the provision of one or more strain gauge(s) is possible, taking the function of the sensor. A further possibility is the provision of a microphone recording the airborne sound or the impact sound of the housing 3a of the grinder unit 3.

Preferably, the vibration or oscillation of the housing 3a of the grinder unit 3 is measured and processed only during an actual grinding cycle. By detecting or measuring what amount of coffee beans prior to stopping the grinder unit 3 has been ground, in other words, what amount of beans has been ground between the start of the grinder unit 3 and the moment when it was detected that it runs in a no-load condition, the grinding operation can be continued, after the coffee bean container 2 having been refilled, until the desired total amount of coffee beans has been ground. This presents the advantage that the already ground amount of coffee beans can still be used for preparing the coffee beverage. Measuring the amount of coffee beans ground prior to stopping the grinder due to the lack of beans in the coffee bean container 2 can be accomplished, for example, by measuring the number of revolutions of the coffee grinder 3 between the start of the grinding operation and the stop of the motor 4 under the influence of the control unit 16 due to lack of beans.

Monitoring and analyzing the vibrations/oscillations of the housing 3a of the grinder unit 3 preferably is started simultaneously with the grinding operation and also stopped therewith or shortly before.

The method and the coffee maker according to the present invention present the following advantages:

Cost efficient and simple design;

Quick detection of a lack of beans;

No run-in time of the grinding unit necessary;

Useable with almost any type of grinder unit;

Changes of the behavior of the grinder unit due to aging do not have a substantial influence on the measured result;

Substantially temperature independent operation;

Substantially friction independent operation;

Measured result substantially independent of the size, kind and degree of roasting of the coffee beans;

Substantially humidity independent operation;

Galvanic separation between sensor and grinder unit; and

The grinding operation can be continued, after the coffee been container having been refilled, up to the desired amount of ground coffee.

What is claimed is:

1. A coffee maker comprising:

at least one coffee bean container;

a grinder unit adapted to grind coffee beans;

a brewing unit having a brewing chamber for extracting the ground coffee beans hot, pressurized brewing water, said grinder unit disposed between said container and said brewing unit;

a housing containing said grinder unit;

at least one sensor, mounted on said housing, for generating a signal indicative of the level and/or the spectrum of an oscillation of said housing generated by said grinder unit during a grinding operation of the grinder unit; and an electronic unit that makes a determination when said signal is indicative of a lack of coffee beans being ground by said grinder unit and stops said grinder unit in response to said determination, wherein the electronic unit further determines an amount of the coffee beans ground prior to stopping said grinder unit based on at least one of a span of time from a start to a stop of the grinding operation of the grinder unit and a number of revolutions of the grinder unit between the start and the stop of the grinding operation.

2. The coffee maker according to claim 1, wherein said at least one sensor is attached to an element connected to said housing.

3. The coffee maker according to claim 1, wherein said at least one sensor includes a piezo-electric, a capacitive or an inductive sensor.

4. The coffee maker of claim 1, wherein said at least one sensor includes an impact sound microphone or an airborne sound microphone.

5. The coffee maker of claim 1, wherein said electronic unit determines when a magnitude of said level of oscillation changes by more than a preset value.

6. The coffee maker of claim 1, wherein said electronic unit determines when a magnitude of said level of oscillation falls below a reference value.

7. The coffee maker of claim 1, wherein said electronic unit determines when a magnitude of said level of oscillation falls outside a first reference value indicative of a lack of coffee beans being ground and a second reference value indicative of a blockage of said grinding unit.

\* \* \* \* \*